US010198790B1

(12) United States Patent
Owechko et al.

(10) Patent No.: US 10,198,790 B1
(45) Date of Patent: Feb. 5, 2019

(54) MULTI-DOMAIN FOVEATED COMPRESSIVE SENSING SYSTEM FOR ADAPTIVE IMAGING

(71) Applicant: HRL Laboratories, LLC, Malibu, CA (US)

(72) Inventors: Yuri Owechko, Newbury Park, CA (US); Daniel Yap, Newbury Park, CA (US); Oleg M. Efimov, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 114 days.

(21) Appl. No.: 15/213,228

(22) Filed: Jul. 18, 2016

Related U.S. Application Data

(60) Provisional application No. 62/193,499, filed on Jul. 16, 2015.

(51) Int. Cl.
*G06T 3/40* (2006.01)
*G02B 17/00* (2006.01)
(Continued)

(52) U.S. Cl.
CPC .......... *G06T 3/4053* (2013.01); *G02B 17/006* (2013.01); *G02B 26/0833* (2013.01);
(Continued)

(58) Field of Classification Search
CPC ... G06T 3/4053; G06T 7/0022; G02B 17/006; G02B 26/0833; G02B 27/1066; H04N 5/2621
See application file for complete search history.

(56) References Cited

U.S. PATENT DOCUMENTS 9,571,819 B1 * 2/2017 Barron ............... H04N 13/0239
2015/0029503 A1 * 1/2015 McMackin ............... G01J 3/18
356/300

(Continued)

OTHER PUBLICATIONS

R.F. Marcia, Z. T. Harmany, and R. M. Willett, "Compressive Coded Apertures for High-Resolution Imaging," 2010. Proc. of SPIE, vol. 7723, pp. 772304-1-772304-11.

(Continued)

*Primary Examiner* — Nicholas G Giles
(74) *Attorney, Agent, or Firm* — Tope-McKay & Associates

(57) ABSTRACT

Described in this disclosure is a space-variant Multi-domain Foveated Compressive Sensing (MFCS) system for adaptive imaging with variable resolution in spatial, polarization, and spectral domains simultaneously and with very low latency between multiple adaptable regions of interest (ROIs) across the field of view (FOV). The MFCS system combines space-variant foveated compressive sensing (FCS) imaging covered by a previous disclosure with a unique dual-path high efficiency optical architecture for parallel multi-domain compressive sensing (CS) processing. A single programmable Digital Micromirror Device (DMD) micro-mirror array is used at the input aperture to adaptively define and vary the resolution of multiple variable-sized ROIs across the FOV, encode the light for CS reconstruction, and adaptively divide the input light among multiple optical paths using complementary measurement codes, which can then be reconstructed as desired.

16 Claims, 13 Drawing Sheets

(51) Int. Cl.
    *G02B 26/08*     (2006.01)
    *G02B 27/10*     (2006.01)
    *G06T 1/00*     (2006.01)
    *H04N 5/262*     (2006.01)
    *G06T 7/00*     (2017.01)

(52) U.S. Cl.
    CPC ........ *G02B 27/1066* (2013.01); *G06T 7/0022* (2013.01); *H04N 5/2621* (2013.01); *G06T 2207/10004* (2013.01); *G06T 2207/20021* (2013.01)

(56) References Cited

U.S. PATENT DOCUMENTS

| | | | |
|---|---|---|---|
| 2016/0014395 A1* | 1/2016 | Murray | G01S 17/89 348/42 |
| 2016/0026253 A1* | 1/2016 | Bradski | G02B 27/225 345/8 |
| 2016/0353039 A1* | 12/2016 | Rephaeli | H04N 5/369 |
| 2017/0026570 A1* | 1/2017 | Shepard | G03B 37/00 |

OTHER PUBLICATIONS

E. Collett, Field Guide to Polarization, SPIE Press, Bellingham, WA (2005), pp. 12-27.

E. J. Candes and M. B. Wakin, "An introduction to compressive sampling," IEEE Signal Processing Magazine, vol. 25, Issue 2, Mar. 2008, pp. 21-30.

* cited by examiner

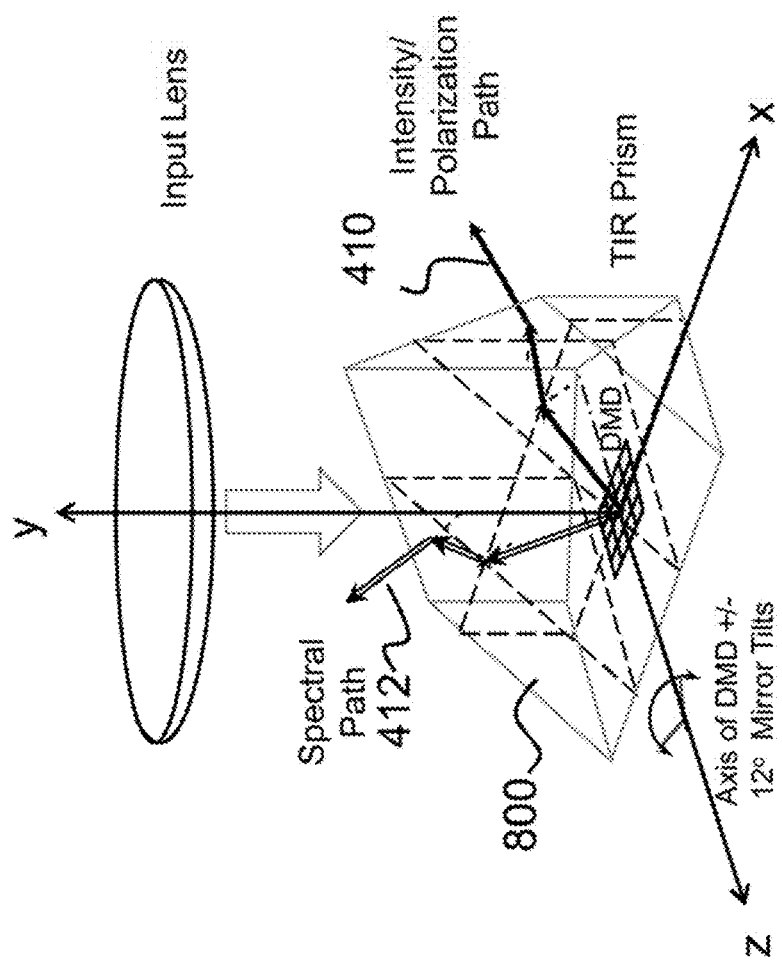
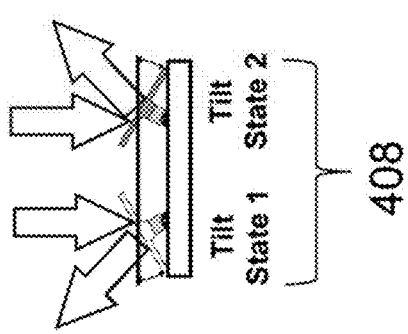
FIG. 8

MULTI-DOMAIN FOVEATED COMPRESSIVE SENSING SYSTEM FOR ADAPTIVE IMAGING

CROSS-REFERENCE TO RELATED APPLICATIONS

The present application is a non-provisional patent application of 62/193,499, flied on Jul. 16, 2015, the entirety of which is hereby incorporated by reference.

BACKGROUND OF INVENTION

(1) Field of Invention

The present invention relates to sensing system and, more particularly, to a system that utilizes multi-domain foveated compressive sensing for adaptive imaging.

(2) Description of Related Art

Surveillance and other monitoring systems are typically dependent on the limitations of the applicable imaging system. The effective spatial and temporal resolution of current imaging systems is limited not only by the sensor pixel count, but also by onboard size, weight and power (SWAP) constraints and by communication bandwidth limitations.

Current imaging systems perform Nyquist sampling of optical images using sensor arrays in which each detector element records a single pixel in the image, which is digitized and stored in an array of pixel values (which can then be compressed). Conventional sampling is not adaptive to the task to be performed and is inefficient in hardware and computational resource utilization because it stores information that is not necessarily needed for a particular task. In addition, image resolution is limited by the physical number of detector elements, resulting in ever larger sensor arrays and SWAP/bandwidth requirements as mission requirements increase. Compressive sensing (CS) is a potentially viable alternative to Nyquist sampling with a sound theoretical basis. It is based on the fact that images have sparse representations for certain sets of basis functions or dictionaries. CS has been used to reconstruct images using far fewer measurements than predicted by the Nyquist sampling criterion by preprocessing with random measurement matrices and using sparsity-enforcing optimization methods to reconstruct the image. Existing CS imaging systems, however, do not take advantage of prior knowledge about the data or the task to be performed with the imagery or real-time adaptation to the data, which limits the amount of SWAP and bandwidth reduction that can be achieved.

Further, a prior art CS optical architecture was proposed by Marcia et al. for single-domain variable resolution CS imaging. See, for example, R. F. Marcia, Z. T. Harmany, and R. M. Willett, "Compressive Coded Apertures for High-Resolution Imaging," SPIE 2010, which is incorporated herein by reference. This approach used a compressive coded aperture (CCA) instead of a DMD and detector array. The CCA architecture is limited to implementing fixed convolutive measurement kernels, cannot implement more general measurements, and is not capable of variable resolution adaptation in the same frame. Due to its limitations, the prior art CS optical architecture has to alternate between low-resolution background frames and high-resolution frames focused on the regions of interest (ROIs), which increases latency. The prior art CS system is also not capable of simultaneous imaging in intensity, polarization, and spectral domains and the lack of patch processing will result in very low frame rates.

Thus, a continuing need exists for a CS system that includes a unique combination of a patch-based dual-path optical design using a single DMD micro-mirror array with complementary light coding to both divide the light and encode it for variable resolution CS imaging in intensity, polarization, and spectral domains without light loss and with high compression ratios.

SUMMARY OF INVENTION

This disclosure provides a system for multi-domain foveated compressive sensing for adaptive imaging. The system includes a lens for providing input light of a scene onto a digital micro-mirror device (DMD) micro-mirror array. The DMD micro-mirror array includes a plurality of individual DMD mirrors, such that each individual DMD mirror has two tilt states for dividing the input light into two paths, a spatial intensity/polarization path and a spectral path. A first two-dimensional (2D) patch deflector mirror array is included for receiving the spatial intensity/polarization path and dividing the scene into a plurality of patches and directing light for each patch onto a detector. A 2D detector array is also included for receiving the plurality of patches and generating measurements for patch reconstruction in intensity and polarization domains. A compressive sensing reconstruction module is included for reconstructing one or more patches in the intensity and polarization domains. Further, a second two-dimensional (2D) patch deflector mirror array is provided for receiving the spectral path and dividing the scene into a plurality of patch rows and separating each patch row vertically from neighboring rows. Thereafter, a grating device receives the patch rows and generates individual patch spectrums in a vertical direction. A wavelength foveated detector array receives the individual patch spectra and generates the foveated compressive measurements in a wavelength dimension of a given patch for a selected region of the spectrum. A combiner module then combines the foveated compressive measurements for the selected region. Finally, a second compressive sensing reconstruction module (which can implemented using the same hardware as the first compressive sensing reconstruction module) reconstructs the one or more patches in the spectral domain based on the selected region.

In another aspect, the wavelength foveated detector array includes a plurality of detectors, with a number of detectors being equal to a desired number of individual patch spectrums as generated by the grating device.

In yet another aspect, a dual path total internal reflection (TIR) prism is included, where wherein each individual DMD mirror is placed in close proximity to the dual path TIR prism.

Further, the 2D detector array includes between one and four detectors per patch, where each detector includes a separate polarization filter.

In another aspect, codes for reconstructing the patches are programed in the two tilt states of each individual DMD mirror.

In another aspect, fovation or local variation of resolution is controlled by causing two or more of the individual DMD mirrors in the plurality of individual DMD mirrors to have common tilt states.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 8 is an illustration depicting a dual-path total internal reflection (TIR) prism for steering DMD-coded light beams into the intensity/polarization and spectral paths with low light loss;

DETAILED DESCRIPTION

Figure 1:
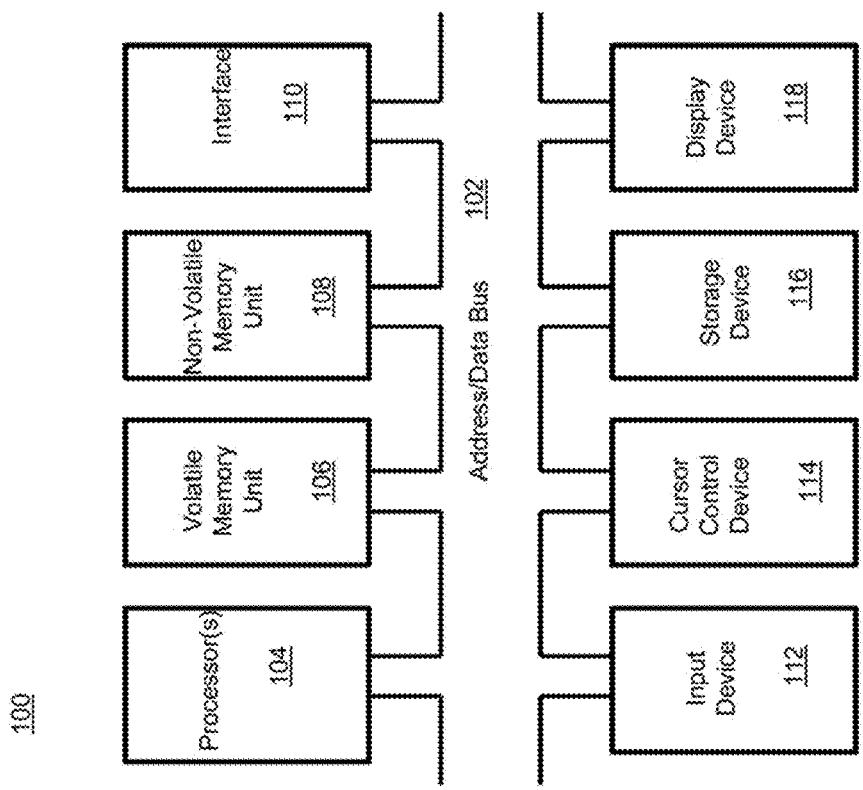
FIG. 1 is a block diagram depicting the components of a Multi-domain Foveated Compressive Sensing (MFCS) imaging system according to various embodiments of the present invention.

The present invention relates to sensing system and, more particularly, to a system that utilizes multi-domain foveated compressive sensing for adaptive imaging. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein In the following detailed description, numerous specific derails are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a description of the various principal aspects of the present invention is provided. Subsequently, an introduction provides the reader with a general understanding of the present invention. Finally, specific details of various embodiment of the present invention are provided to give an understanding of the specific aspects.

(1) Principal Aspects

Various embodiments of the invention include three "principal" aspects. The first is a multi-domain foveated compressive system. In various aspects, the system may include the relevant sensing components, lenses, and arrays, and also includes any necessary processing components in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
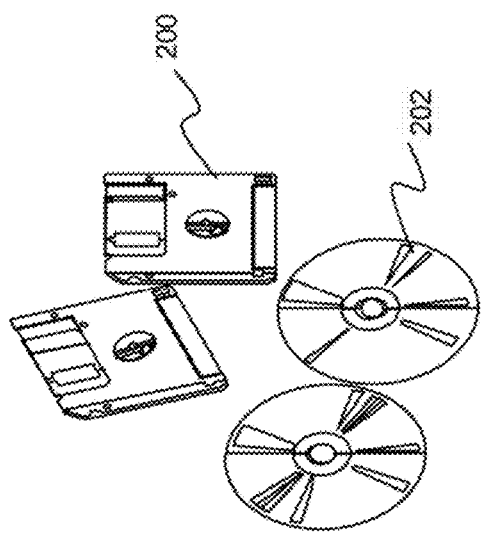
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Introduction

Described in this disclosure is a space-variant Multi-domain Foveated Compressive Sensing (MFCS) system for adaptive imaging with variable resolution in spatial, polarization, and spectral domains simultaneously and with very low latency between multiple adaptable regions of interest (ROIs) across the field of view (FOV). The MFCS system combines space-variant foveated compressive sensing (FCS) imaging covered by a previous disclosure with a unique dual-path high efficiency optical architecture for parallel multi-domain compressive sensing (CS) processing. A single programmable Digital Micromirror Device (DMD) micromirror array is used at the input aperture to adaptively define and vary the resolution of multiple variable-sized ROIs across the FOV, encode the light for CS reconstruction, and adaptively divide the input light among multiple optical paths using complementary measurement codes.

The MFCS architecture enables each detector to perform measurements for the reconstruction of an $n^2$-pixel image patch in all three domains simultaneously using a single common aperture, where n can be on the order of 64 to 128. With these innovations, the MFCS system can achieve more than 100× higher space-variant ROI resolution than Read-Out Integrated Circuit (ROIC) based systems using the same size focal plane array (FPA). All domain outputs in all ROIs can be available simultaneously, or an ROI can be processed in the spectral domain only with increased signal-to-noise ratio (SNR) at the expense of spatial resolution within the ROI. For the same maximum ROI spatial resolution and frame rate, the MFCS can achieve a 10× to 100× reduction in data bandwidth compared to existing ROIC systems. Furthermore, since the spatial resolution is defined by the DMD, the approach achieves the same spatial resolution as an ROIC or slew-to-cue system but using a FPA with 1000× to 4,000× fewer detector elements. This FPA scaling advantage suggests a tactically relevant, scalable, small size, weight, complexity, and cost (SWAP-C) system—particularly in the MWIR and LWIR where WFOV high resolution staring systems are complex and expensive due to material non-uniformity, cross-talk, operating temperature (e.g., cryogenically cooled), and ROIC hybridization limitations. The MFCS system also reduces SWAP-C compared to "slew-to-cue" space-variant systems for the same FOV and resolution by eliminating mechanical slewing of large optical elements.

This disclosure, in one embodiment, is applicable for sensor systems that would benefit from sensing multiple modalities such as intensity, polarization, and spectrum simultaneously with variable resolution in different regions of interest for improved visualization, detection, and recognition of objects for wavelengths ranging from visible to LWIR. Applications include automatic target recognition, surveillance, active safety, protection of rotorcraft during landing/takeoff, and obstacle avoidance/navigation for autonomous vehicles and UAVs. Further details regarding the MFCS system are provided below.

(3) Specific Details of Various Embodiments

Figure 3:
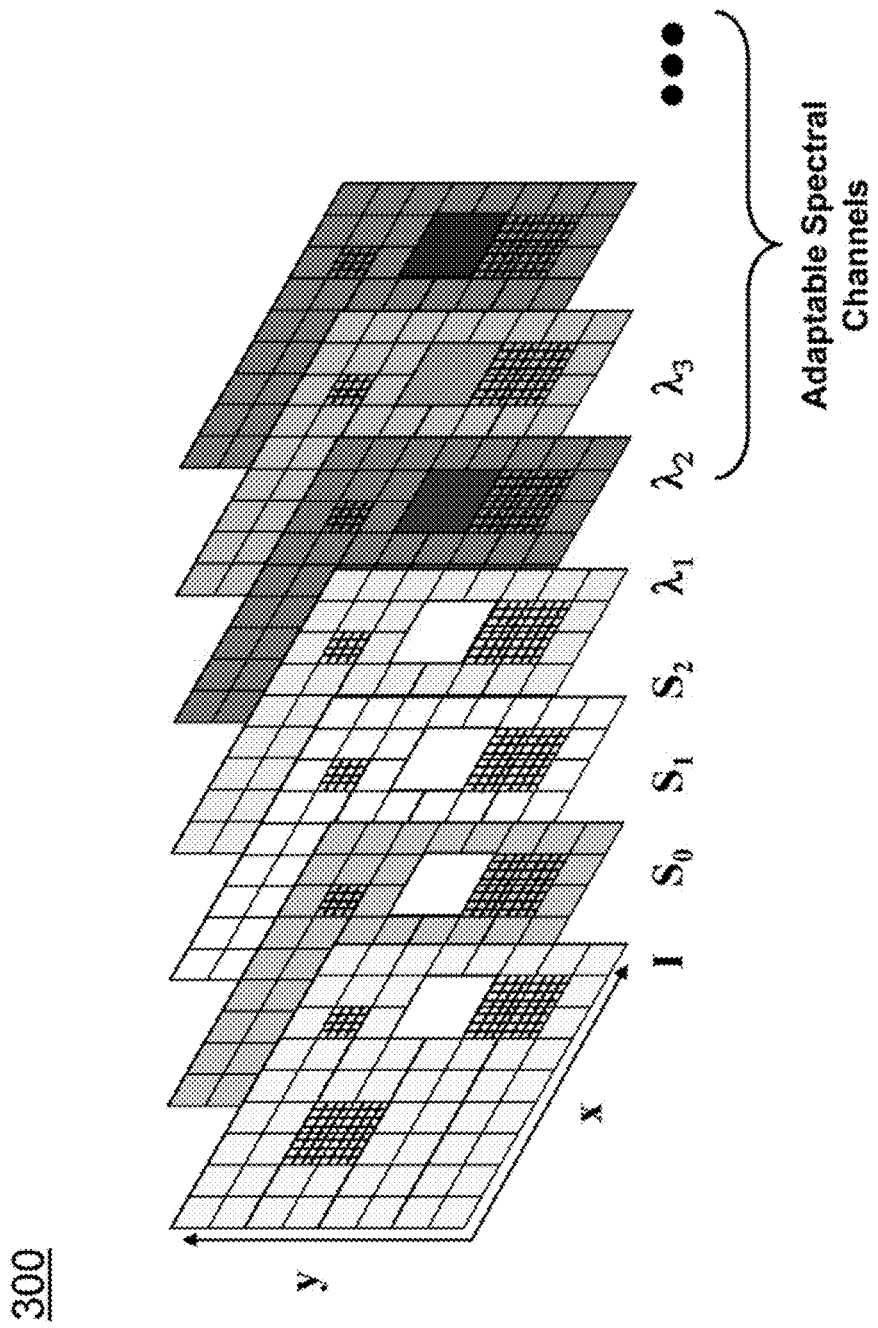
FIG. 3 is an illustration depicting example outputs of the MFCS imaging system, depicting multiple images with variable spatial resolution regions of interest (ROIs) in intensity, polarization, and spectral domains.

The space-variant Multi-domain Foveated Compressive Sensing (MFCS) system achieves adaptive imaging with variable resolution in spatial, polarization, and spectral domains simultaneously and with very low latency between multiple adaptable regions of interest (ROIs) across the field of view (FOV). The MFCS system combines space-variant foveated compressive sensing (FCS) imaging with a unique dual-path optical architecture for parallel multi-domain compressive sensing (CS) processing. During operation, the MFCS system is operable for reconstructing image patches in multiple domains. For example, FIG. 3 illustrates foveated image outputs 300 of the MFCS system for multiple domains (e.g., intensity, polarity, and spectral). All domain outputs in all ROIs can be available simultaneously, or an ROI can be processed in the spectral domain only with increased SNR at the expense of spatial resolution within the ROI.

(3.1) Dual Paths Using a Digital Micromirror Device (DMD) Micromirror Array

Figure 4:
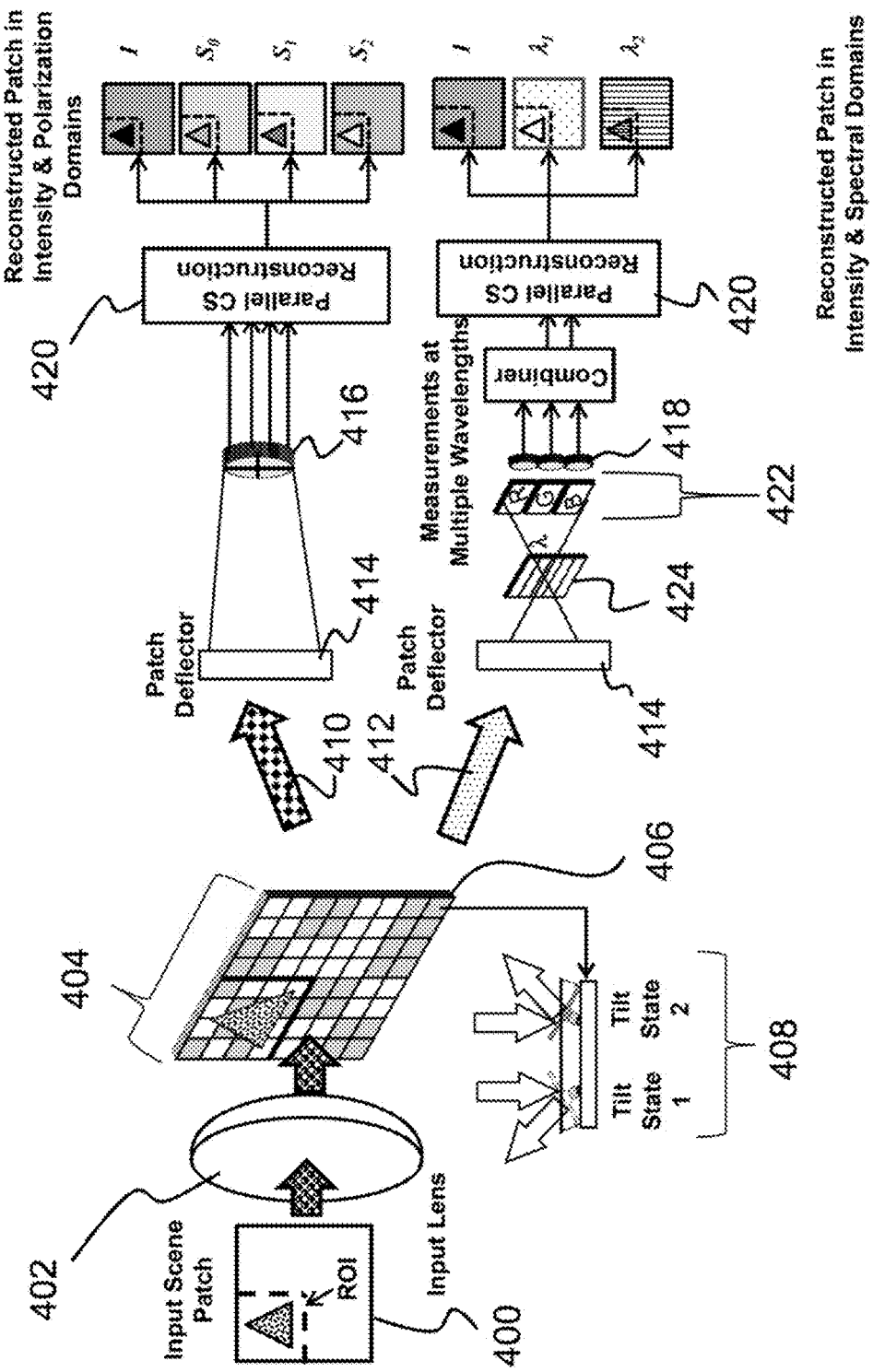
FIG. 4 is an illustration depicting the MFCS architecture.

An example of the MFCS architecture is shown in FIG. 4. The input scene 400 is imaged (using an input lens 402) onto an array 404 of micromirrors. The input lens 402 is, for example, a convex or compound imaging lens. Further, any suitable array 404 of micromirrors can be used, a non-limiting example of which includes the DLP9500 DMD device manufactured by Texas Instruments, which has 1920×1080 micromirrors on a 10.8-μm pitch. Each individual DMD mirror 406 in the array 404 has two tilt states 408 of ±12°. The DMD array 404 reduces complexity in the MFCS by performing multiple functions simultaneously. It defines the spatial pixels and adapts resolution in multiple ROIs for all of the domains simultaneously, multiplies the input by a series of binary spatial measurement codes for compressive sensing (CS) imaging, and adaptively divides the input light into two paths. The first path (spatial intensity/polarization path 410) is for the intensity/polarization domains and the second path (spectral path 412) is for the spectral domain. Note that all domain images are automatically registered since pixels are defined by the DMD array 404 and not by the detector array. In other words, the domain images are registered due to the fact that the reconstructed image is defined by the imaged scene focused on the DMD array 404 and not by the different detector arrays in the two optical paths. The DMD array 404 is common to both paths.

Using the same DMD array 404 to both divide the light between the domains and encode the light for CS reconstruction is made possible by using balanced complementary measurement codes for the two paths. This results in high photon utilization efficiency because both tilt states 408 of each micromirror 406 are used to direct, measure, and process light. In addition, since all domains are measured simultaneously at all ROIs and all domains are reconstructed in parallel, there is very low latency between them. Another advantage is that since the resolution from electro-optical (EO) to long wavelength infrared (LWIR) is determined by the pitch of the low-cost wide-band Si—Al based micromirror array and the space-variant resolution of measurement codes, the number of detectors can be greatly reduced, which is especially advantageous for the infrared (IR) bands.

(3.2) 2D Patch Deflector Mirror Array

Figure 10:
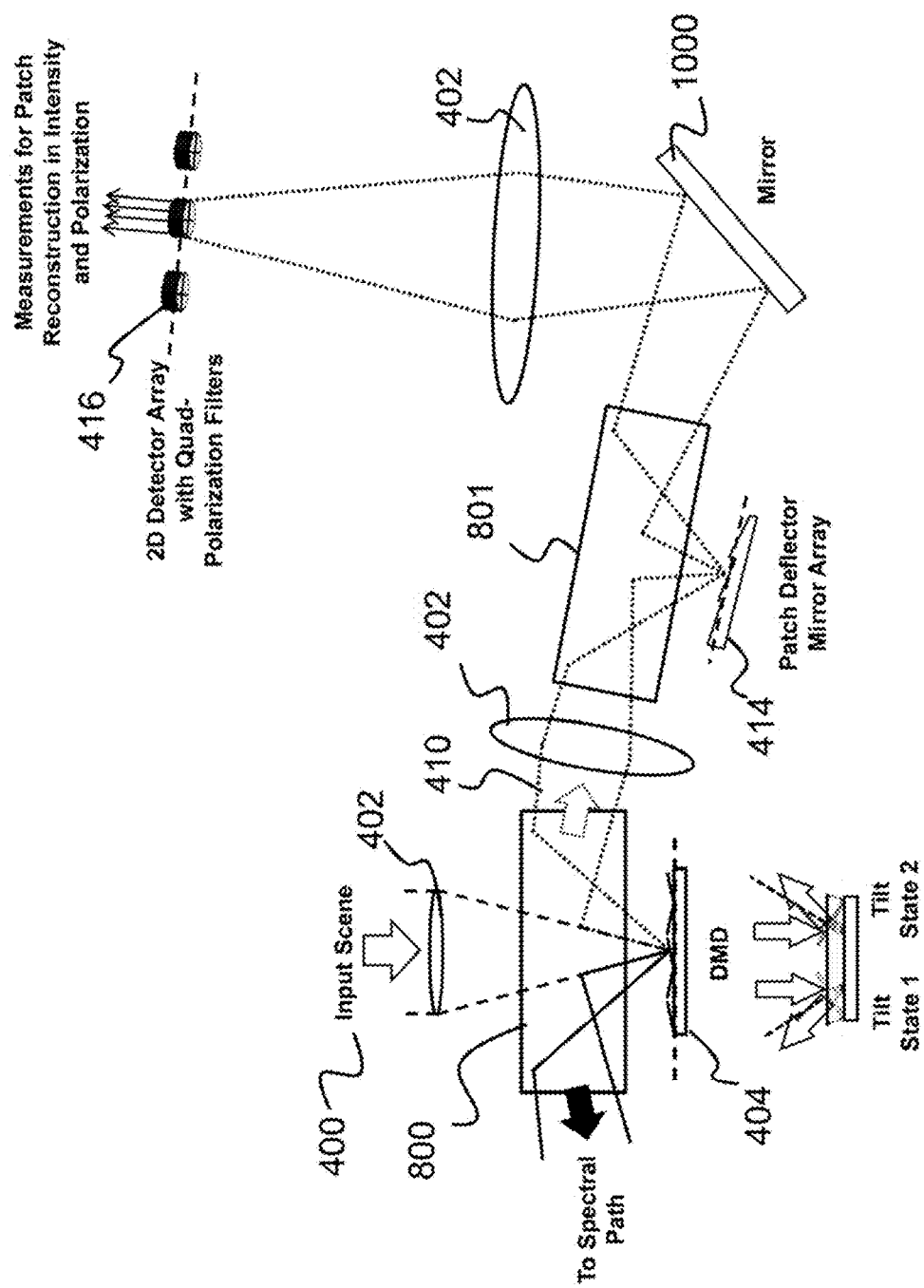
FIG. 10 is an illustration depicting an MFCS optical path for intensity and polarization imaging.

To enable the use of parallel CS processing for high throughput, the DMD field-of-view (FOV) is divided into patches using a 2D patch deflector mirror array 414. The patch deflector mirror array 414 both defines patches and directs light for each patch to its individual detector. The patch deflector mirror array 414 is, for example, a metal or glass block with a series of machined steps tilted at different angles, as shown in FIG. 10.

Spatial codes are represented on the DMD array 404 by programming the binary tilt states of the DMD mirrors. The optical inner-product of each patch with the spatial code on the DMD 404 is measured using the patch's dedicated detector 416 or 418. The detectors 416 and 418 could be, for example, discrete photodiodes or the pixels in a CCD or CMOS imaging chip.

All of the patches can be reconstructed in parallel by independently performing CS processing 420 on each detector's 416 or 418 measurements. Note that patches do not define ROIs; an ROI can encompass multiple patches or fractions of patches. The DMD 404 defines the ROIs and their space-variant spatial resolutions.

The two optical paths for a single patch are illustrated in FIG. 4. The optical architecture implements multiple patches in parallel. For the example design in FIG. 4, the spatial intensity/polarization path 410 uses between one and four detectors 416 per patch (depending on a number of polarization parameters that are measured), each with a separate polarization filter to enable reconstruction of the first three Stokes parameters. An alternative optical design utilizes three polarization selective beam splitters and 45 degree polarization rotators to define four optical paths for the four polarization measurements. This will result in greater light efficiency at the expense of an increased number of optical components.

Figure 6:
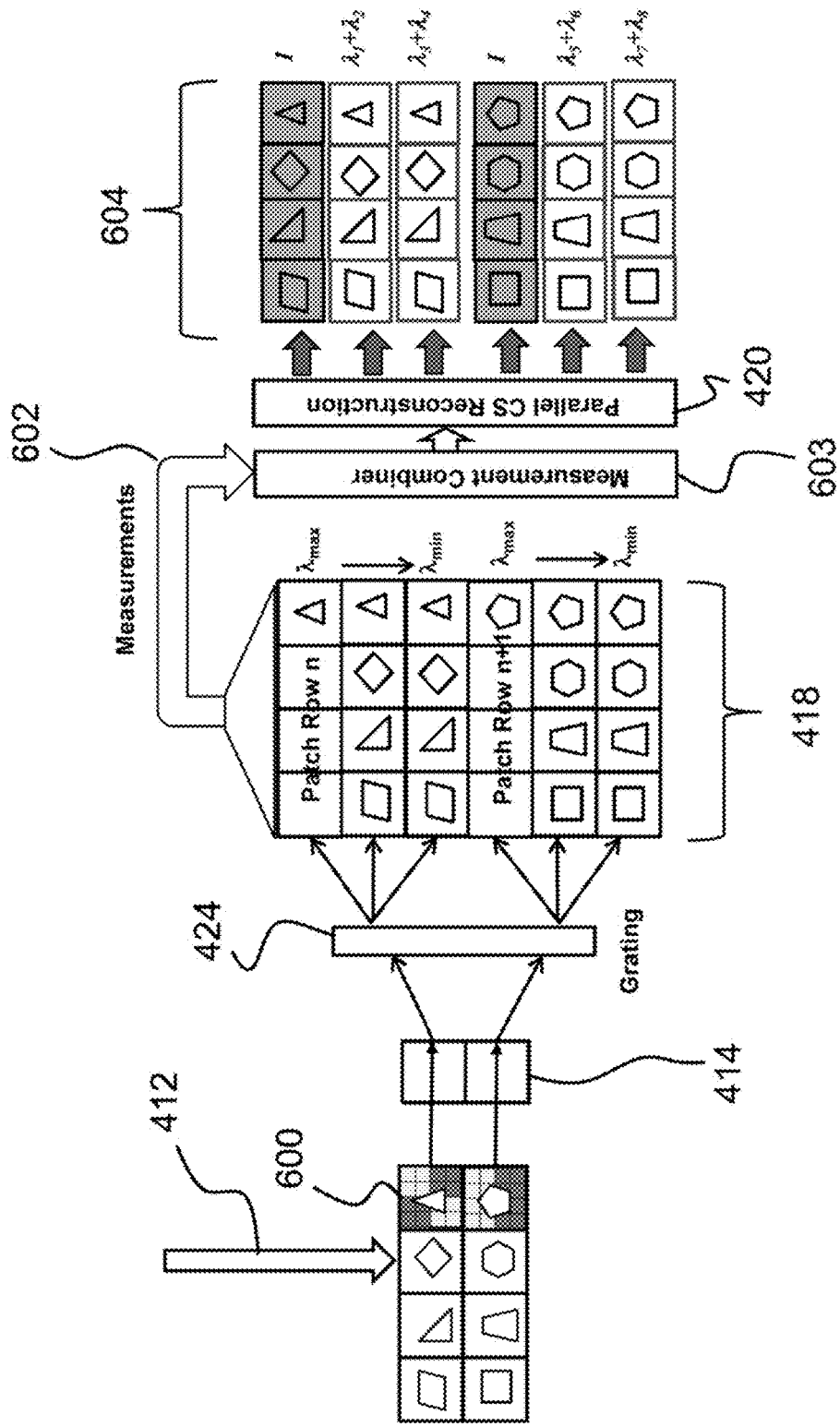
FIG. 6 is an illustration depicting intensity/spectral path reconstruction of FOV patches with space-variant spatial, spectral, and temporal resolution.

The number of detectors 418 per patch in the spectral path 412 is equal to the desired number of spectral channels 422 as obtained through grating 422 (as described in further detail below regarding FIG. 6). Thus, the first path 410 has broadband imaging in intensity and polarization domains while the second path 412 has spectrally resolved (spectrometric) imaging.

Figure 5:
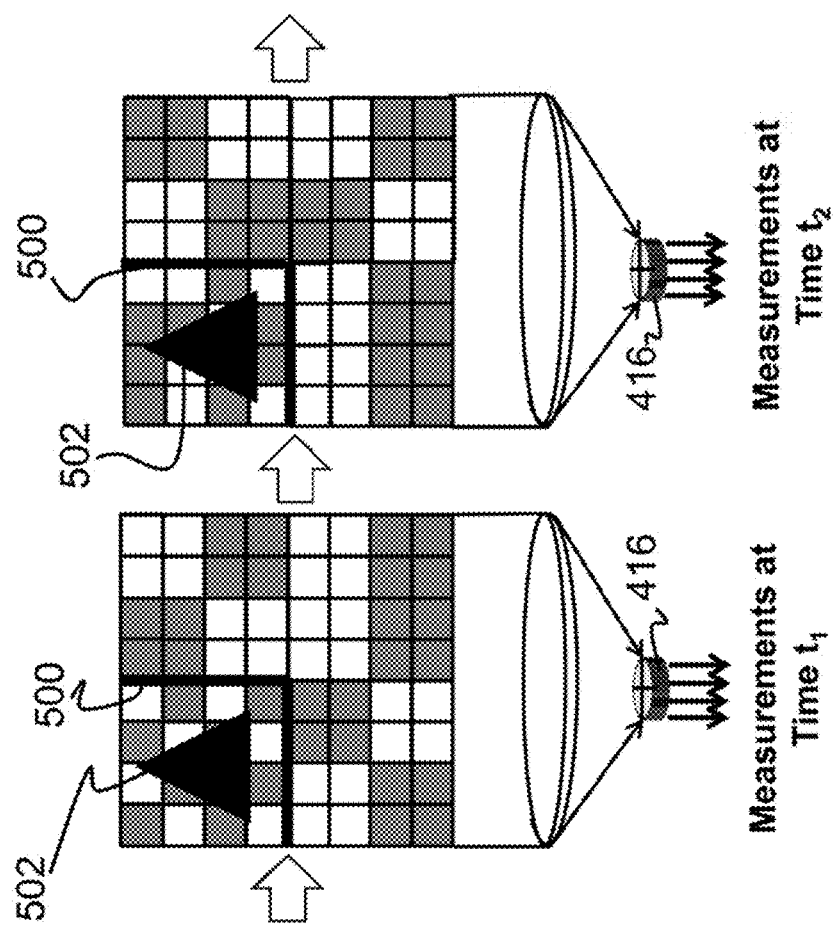
FIG. 5 is an illustration depicting time-sequenced FCS measurements of a DMD-coded field-of-view (FOV) patch with space-variant spatial and temporal resolution in the intensity/polarization domains.

As noted above as further depicted in FIG. 5, the spatial intensity/polarization path uses four detectors 416 per patch, each with a separate polarization filter. Further, sequential CS measurements are made in the intensity/polarization optical path for a single patch of n×n pixels. A typical value for n which is used, for example, by the patch-based InView CoSIDE intensity-only CS camera is n=64. For further understanding, FIG. 5 depicts time-sequenced FCS measurements of a DMD-coded FOV patch with space-variant spatial and temporal resolution in the intensity/polarization domains. Part of a higher spatial resolution ROI 500 containing a triangle object 502 is shown outlined. The spatial codes have finer spatial resolution in the ROI 500.

(3.3) Adaptive Foveation

The patch and ROI based architecture of the MFCS system further provides adaptive foveation of ROIs and light efficient imaging in intensity, polarization, and spectral domains. Assuming an N×N DMD micromirror array, the maximum number of patches is $(N/n)^2$. A patch measurement is made by optically multiplying the input patch by the spatial code on the DMD array and integrating using a single detector. Since spatial-resolution elements are defined by setting local groups of micromirrors to the same value in the DMD array, space-variant resolution can be implemented by using higher resolution spatial codes in the portions of high resolution ROIs that overlap the patch. Using existing CS algorithms, the $n^2$ patch pixels can be reconstructed using $\delta n^2$ sequential measurements, where the CS subsampling factor $\delta$ can range from approximately 0.1 to 0.01, depending on the sparsity of relevant information in a patch, in the measurement basis. Therefore, an MFCS system can reconstruct N×N pixels over the FOV using $(N/n)^2 \delta n^2 = \delta N^2$ measurements using $(N/n)^2$ detectors.

In contrast, a custom ROIC system would require $N^2$ detectors to achieve the same spatial resolution range for a fixed FOV, or $n^2$ times more than MFCS (4000× more for n=64). For the same N×N FOV resolution, frame time T, and assuming a fraction γ of the pixels are read out (γ is the ratio of the ROI areas to the total FOV, which can typically range from $10^{-1}$ to $10^{-4}$), the ROIC and MFCS data bandwidths will be $N^2/T$ and $\gamma \delta N^2/T$ measurements per second, respectively. Therefore, the MFCS as described herein will have a factor of γδ smaller data bandwidth than conventional non-foveated ROIC systems, where γδ can range from $10^{-2}$ to $10^{-6}$. Another adaptivity advantage of the MFCS system over custom ROIC and slew-to-cue systems is that resolution, frame time, and data bandwidth can be adapted on a patch-by-patch basis. A fundamental lower limit on the MFCS frame time T is $\delta n^2\, T_{DMD}$, where $T_{DMD}$ is the switching time of the micromirrors, which is 140 μsec for the DLP9500. If T is 33 milliseconds, up to 200 measurements can be made per patch, which is sufficient for patches of 64×64 pixels.

(3.4) Spectral Path Reconstruction

The spectral path is treated somewhat differently than the intensity/polarization path. For example, FIG. 6 illustrates how CS measurements are made in the spectral path 412 for a set of patches. In the spectral path 412, DMD-encoded patch rows 600 (as encoded by the DMD array of FIG. 4) are separated optically in the vertical direction using the patch deflector mirror array 414 and then passed through a grating 424 that spreads the spectral information of each patch vertically to fill the gaps between patch rows before being imaged onto a 2D detector array 418. In other words, the grating 424 can be, for example, a set of rulings etched in a mirror or flat piece of glass, similar to the gratings used in conventional spectrometers. The grating 424 separates the wavelengths into different spectral channels that are measured by the detector array 418 (e.g., a 2D spectrometer detector array, with one detector per patch and band).

The measurements are then combined 602 by a combiner 603 that combines the measurements by adding together subsets of the rows in the detector 418 that correspond to different wavelengths. This enables CS reconstruction to be performed in different wavelength bands.

After the measurements 602 are combined, CS reconstruction 420 is performed by solving the FCS imaging equation below, which results in a collection of reconstructed patches in programmable intensity and spectral band combinations.

In other words, by electronically combining various subsets of detector measurements for the same patch and using the same CS reconstruction as in the spatial intensity/polarization path, various spectral segments or combinations of segments can be imaged with variable spatial resolution and with the above advantages of single-detector CS patch reconstruction. Note that if only intensity imaging needs to be made in a patch, then the detector outputs from both paths can be added together to maximize photon utilization efficiency.

(3.5) Independent Spatial and Spectral Foveation

Figure 7:
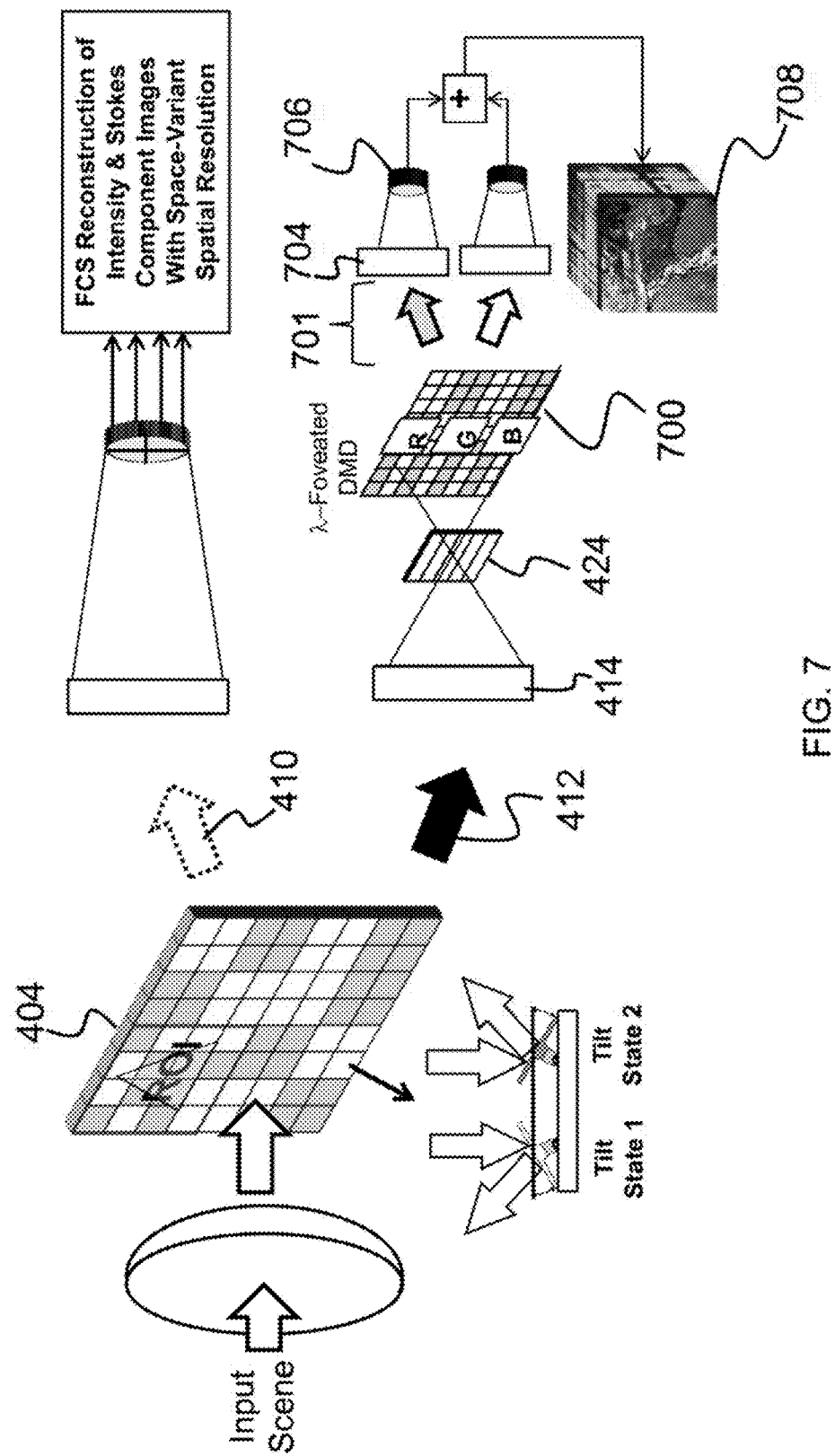
FIG. 7 is an illustration depicting MFCS architecture with modification of spectral path for independent spatial and spectral foveation.

By using a second DMD 700 in the spectral path 412, as shown in FIG. 7, foveation can also be performed in the wavelength dimension in addition to the two spatial dimensions. Each patch row is separated vertically from its neighboring rows using a patch row deflector mirror array 414 in order to make room for the individual patch spectrums formed by a grating 424 in the vertical direction. The individual patch spectra are then imaged on the λ-foveated DMD (second DMD 700) which performs foveated compressive measurements in the wavelength dimension of a given patch at hyperspectral resolution for selected regions of the spectrum. A second set of patch deflectors 701 and patch detector arrays 704 are then used to obtain the compressive measurements. By using balanced complementary measurement codes, light from both λ-foveated DMD mirror tilt state optical paths can be detected and used in the CS reconstruction, thereby maximizing photon utilization and measurement SNR. Each measurement will already be coded spatially from the first DMD 404 and the second DMD 700 adds coding in the wavelength dimension. Alternatively, the two paths 701 from the λ-foveated DMD 700 can be used to sense different orders of the multi-band light diffracted by the grating 424. For example, one path (of the two paths 701) could be used for foveation and reconstruction in the 0.7 to 1.3 μm band and the other (of the two paths 701) in the 1.4 to 2.8 μm band. Reconstruction is performed in a 3D hyperspectral domain (e.g., hyperspectral cube 708) in dimensions x, y, and λ. Foveation can be controlled independently in the three dimensions (e.g., x, y, and λ) by using the patch deflectors to separate the patch spectra on the λ-foveated DMD. Different patches can have different λ resolution distributions. Similarly to the intensity/polarization path 410, the number of detectors in the spectral path 412 can also be greatly reduced compared to conventional spectrometers through the use of foveated compressive sensing.

In summary, relative to ROIC and slew-to-cue systems, the MFCS architecture of this disclosure reduces the number of detectors needed per pixel for a given ROI spatial resolution range by greater than 1000× and reduces the data bandwidth for a given FOV, spatial resolution, and frame time by using DMD micromirrors to define and encode pixels for CS reconstruction in the spatial, polarization, and spectral domains. The MFCS system also provides the additional capabilities of simultaneous space-variant imaging and sensor fusion in all the domains for multiple ROIs with adaptive spatial and temporal resolution, which ROIC and slew-to-cue systems cannot provide.

(3.6) Dual-path TIR Prism

An important component of the optical design is the new use of a dual-path total internal reflection (TIR) prism. As shown in FIG. 8, the TIR prism 800 is used to image the input scene on the DMD and to direct the resulting CS-coded light from the DMD mirror array into both the intensity/polarization path 410 and spectral path 412 with high efficiency. The TIR prism 800 is placed in contact or near contact with the DMD. In other words, each individual DMD mirror in the DMD array (i.e., element 404 in FIG. 4) includes a TIR prism 800. In FIG. 4, for example, the prism (not shown) is located immediately behind the DMD 404. It is used to form the two optical paths 410 and 412.

Input light does not satisfy the TIR condition for the upper TIR surface of the prism and therefore is imaged on the DMD. Light rays reflected from the micro-mirrors arrive at the prism TIR surface at a shallow angle and therefore satisfy the TIR condition so they are reflected with high efficiency into one of the two paths, the intensity/polarization path 410 and the spectral path 412.

The two DMD micro-mirror tilt states 408 direct the coded reflected light into either the intensity/polarization or spectral paths. By programming balanced complementary measurement codes into the DMD micro-mirror array, each micro-mirror always contributes photons to detectors in one of the two paths to maximize photon utilization for reconstruction of a pixel. A left tilt encodes a "1" spectral measurement code value and a "0" intensity/polarization code value for that pixel, and directs the light into the spectral path 412. Similarly, a right tilt encodes a "0" spectral measurement code value and a "1" intensity/polarization code value for that pixel, and directs the light into the intensity/polarization path 410. In addition, by setting all of the micro-mirrors in a patch to the same tilt state, all of the light for a patch can be directed into the spectral path 412 without spatial coding. This enables the SNR of spectral analysis to be increased for a ROI at the expense of spatial resolution in that ROI.

(3.7) 2D Patch Deflector Mirror Array

Figure 9:
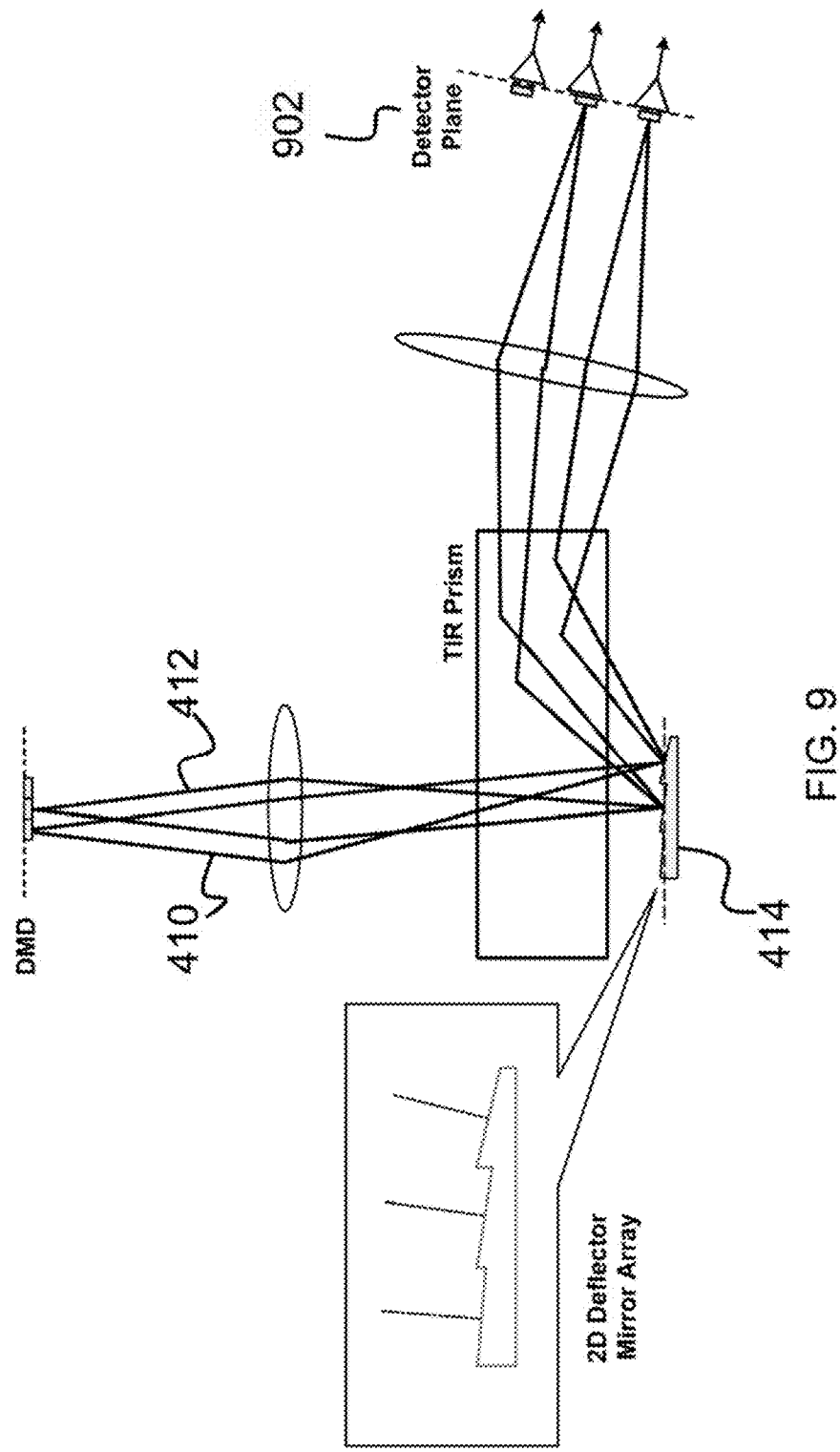
FIG. 9 is an illustration showing details of a TIR prism based 2D patch deflector mirror array for defining image patches and directing each of them to its corresponding detector.

The same principle of light deflection using a TIR prism and mirror array is used to define the image patches and direct light from each patch to its respective detector. FIG. 9, for example, shows details of the 2D patch deflector mirror array 414. By designing the individual fixed mirror tilts in two dimensions, light for each image patch can be directed to the detector for that patch and the detectors can be arranged in modifiable 2D configurations in the detector plane 902. FIG. 9 shows the use of successively increasing tilts to separate the patches at the detector plane 902.

The patch deflector mirror arrays 414 are used in both paths 410 and 412 of the MFCS architecture. For controlling the light from patches, the individual mirrors can be much larger than the DMD micro-mirrors and they can be fixed in angle. Since the mirrors are fixed, it will be straightforward to give each mirror different tilts along two axes so that the patches can be directed to detectors in arbitrary arrangements on the detector plane 902. For example, the patches can be separated uniformly to allow use of discrete photodiodes or allow increased separation between a reduced number of detector elements on a FPA in order to reduce optical and detector crosstalk. This method is more flexible and light efficient than using lenslet arrays to define image patches. Patch deflector mirror arrays are used in both paths of the MFCS architecture. The number of mirrors will be equal to the total number of patches in the image.

The optical path for intensity and polarization imaging (i.e., the intensity/polarization path 410) is shown in FIG. 10. The input scene 400 is imaged (via a lens 402 and dual path TIR prism 800) on the DMD 404 and light from mirrors in the "right tilt" state is imaged (via a second lens 402 and second TIR prism 801) onto a patch deflector array 414. Light from each mirror in the patch deflector array 414 is in turn focused (via, for example, a mirror 1000 and lens 402) onto a set of four detectors in a detector array 416, each of which has a wide-band polarization filter oriented at 0, 45, 90, or 135 degrees. The tilt states are used to both direct light into the intensity/polarization path and encode light for compressive measurements. By using balanced complementary binary measurement codes, a "right tilt" mirror state directs light to the intensity/polarization path 410, encodes a pixel measurement code value of "1" for that path, and encodes a "0" for the spectral path, whereas a "left tilt" mirror state does the same except with the effects on the spectral and intensity/polarization paths reversed. A sequence of measurements from a detector is used to reconstruct a patch image in one of the four polarizations, which are used to compute images in the first three Stokes polarization parameters using well known methods, such as those described by E. Collett, in *Field Guide to Polarization*, SPIE Press, Bellingham, Wash. (2005), the entirety of which is incorporated herein by reference. If polarization imaging is not required for a particular patch, measurements of the four polarizations can be added together to form a single higher SNR measurement sequence which can be used to reconstruct an intensity image. Note that the spatial resolution and ROIs are determined by the DMD micro-mirror array 404, not by the detector array 416. The patch deflector mirror array 414 determines the image patches and directs light from each patch to a detector in the detector array 416.

Figure 11:
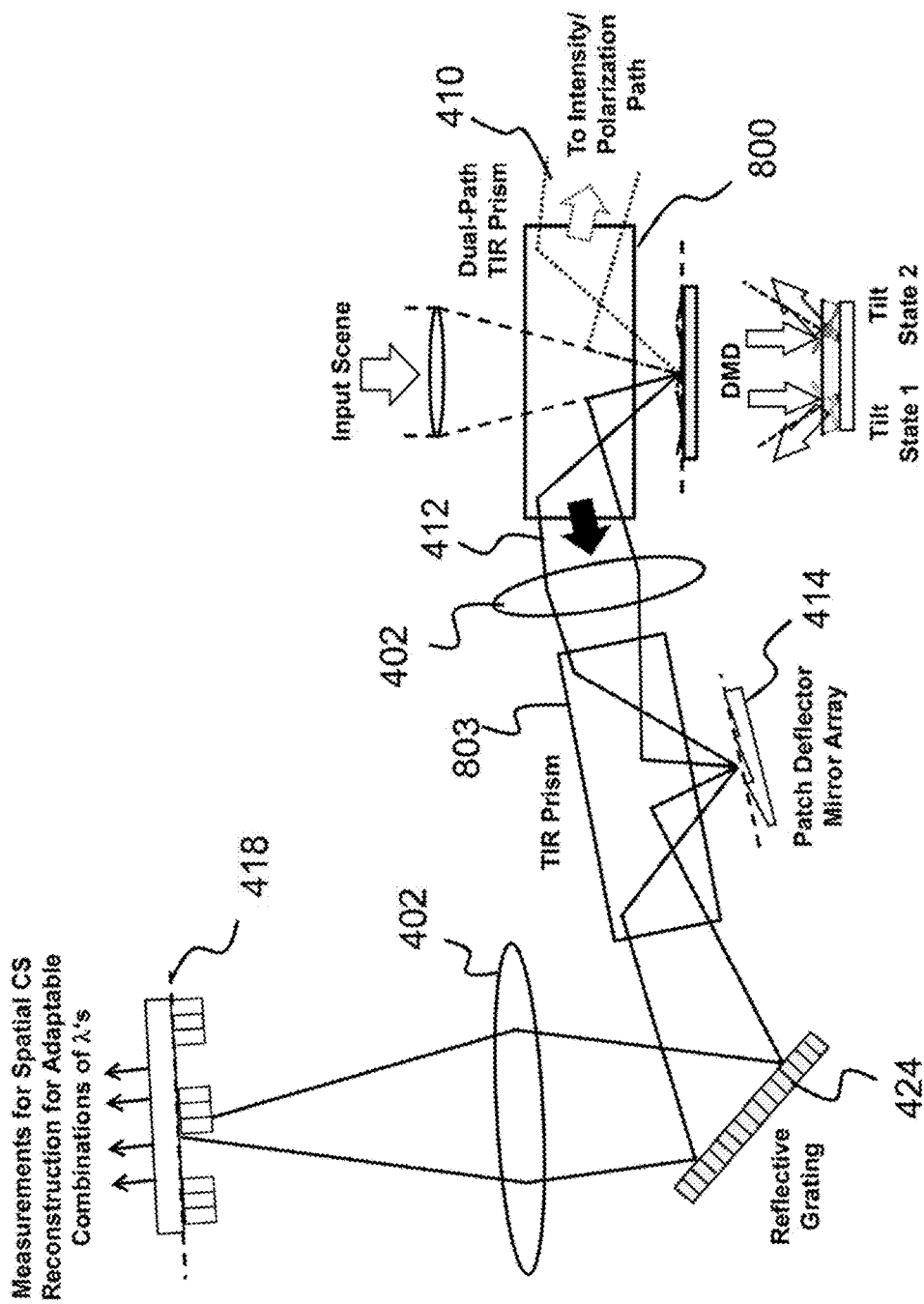
FIG. 11 is an illustration depicting an MFCS optical path for spectral imaging.

The optical path fix spectral domain imaging (i.e., spectral path 412) is shown in FIG. 11. It is similar to the intensity/polarization path 410 in that the spectral path 412 is created by the dual path TIR prism 800 and passes through a lens 402 to a TIR prism 803, but uses a grating 424 after the patch mirror deflector array 414 to separate the wavelengths. The patches are then directed through a lens 402 onto a detector array 418 (e.g., 2D spectrometer detector array or wavelength foveated detector array) with sufficient space between them to allow detection of non-overlapping spectra for each patch. The detector array 418 provides measurements for spatial compressive sensing reconstruction for adaptable combinations of wavelengths. In other words, since light at all wavelengths is encoded with spatial information by the input DMD, by adding measurements from various combinations of detectors for each patch, spectral images for programmable spectral profiles can be reconstructed. In addition, by using a second DMD in this path, as shown in FIG. 7, foveation on ROIs in the wavelength dimension can be implemented in addition to the two spatial dimensions using one or two detectors per patch. Similarly to the spatial encoding DMD, the photon utilization efficiency will be greater using two detectors and binary balanced DMD codes in the spectral dimension.

(3.8) Patch Processing

The patches are defined according to the pattern of mirror tilts programmed on the DMD 404. An example of a patch (labeled 500) is shown in FIG. 5. The patches are the same in both optical paths.

Figure 12:
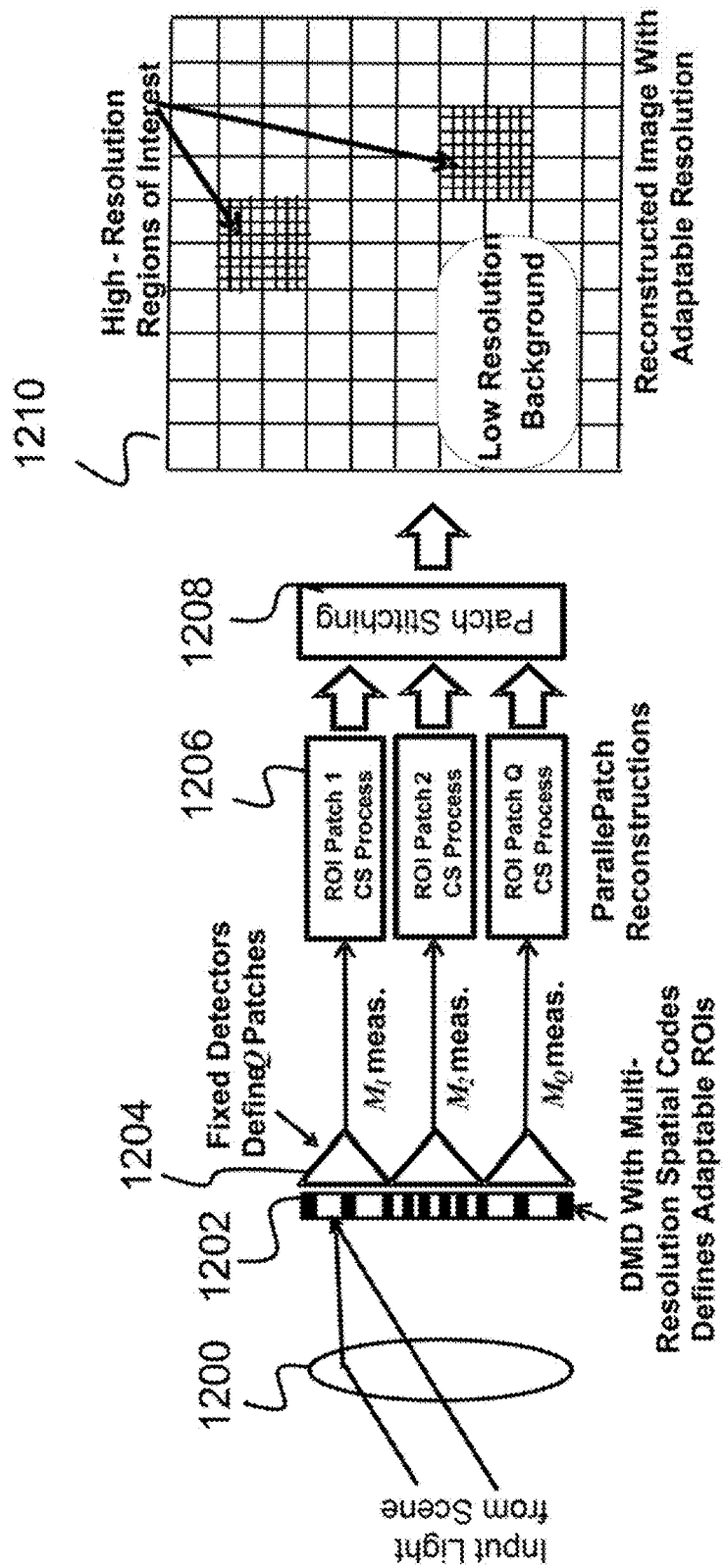
FIG. 12 is an illustration depicting foveated compressive sensing (FCS) for multi-ROI adaptable spatial and temporal resolution.

In the simplified illustration of FIG. 12, the input aperture is divided into Q parallel subapertures or patches and each patch is measured using a single photodiode detector. An imaging lens 1200 of diameter D images the scene onto the Digital Mirror Device (DMD) 1202 that implements the measurement kernel. Each of the Q detectors 1204 then spatially integrates the product of the imaged scene and the measurement kernel for its patch, forming an inner product CS measurement. The ROI patches are then reconstructed 1206 in parallel, which can then be stitched together to form the reconstructed image 1208 with adaptable spatial and temporal resolution. For example, patches belonging to lower resolution ROIs or the background can be updated at fast frame rates for rapid detection of threats using polarization or spectral information while patches belonging to high resolution ROIs are updated at slower rates for high resolution target identification.

The processing flow for FCS imaging can be summarized as follows:

Reconstruction can be performed using known CS algorithms that maximize sparsity in the reconstruction using L1 norm minimization. An example of such an algorithm was described by E. J. Candes and M. B. Wakin, in "An introduction to compressive sampling," IEEE Signal Processing Magazine, Vol. 25, Issue 2, March, 2008, the entirety of which is incorporated herein by reference. The differences between FCS and conventional CS are the use of the foveation operator to modify the measurement kernel and parallel reconstruction of the Q image patches. FCS measurements of each patch are performed sequentially so the total number of measurements can be adapted by varying the sampling rate. All of the patches are measured and reconstructed 1206 in parallel, which maps well to multi-core or FPGA processors. The architecture is essentially a set of Q parallel single-pixel CS cameras in which the measurements for each subcamera are independently controlled both spatially and temporally. In particular, the limit of Q=1 corresponds to the single-pixel CS camera while $Q=N^2$ corresponds to conventional imaging using a focal plane array with N×N pixels, where each patch becomes a single pixel.

Patches can overlap with different ROIs in the scene. A portion of the measurements is used to detect the ROIs using lower resolution, and the rest of the measurements are used for higher resolution ROI reconstruction. For example, patches belonging to lower resolution ROIs or the background can be updated at short frame times for rapid detection of threats using polarization or spectral information while patches belonging to high resolution ROIs are updated at slower rates for high resolution target identification. This trade-off capability is discussed further below. Through the process of foveation, the relative proportion of the total number of measurements can be increased for some ROIs at the expense of others. Foveation is achieved by adapting the spatial and temporal measurement sampling rates for the ROI patches using the DMD micromirrors. The DMD implements the different measurement kernels that are adapted for the ROIs. The foveation architecture extends the patch-based single-domain non-foveated compressive sensing architecture, which has been implemented for example by InView Corporation, to include adaptive foveation and multi-domain imaging.

Figure 13B:
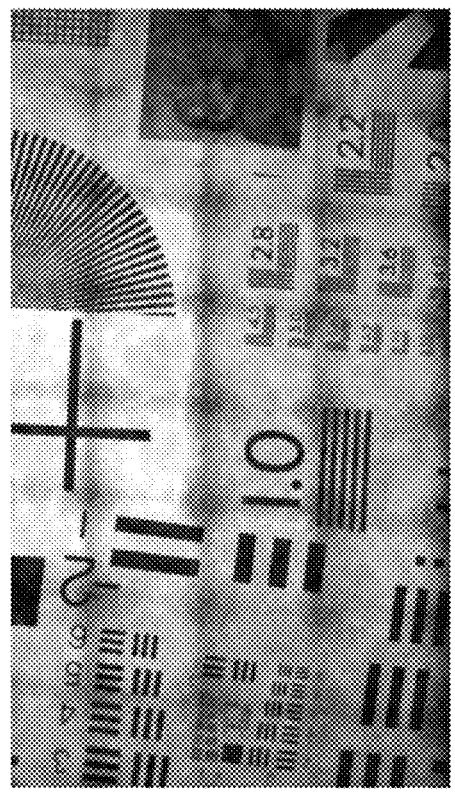
FIG. 13B is an illustration depicting a demonstration of patch-based CS reconstruction showing individual reconstructed 64×64 patches as being stitched into a composite image.
Figure 13A:
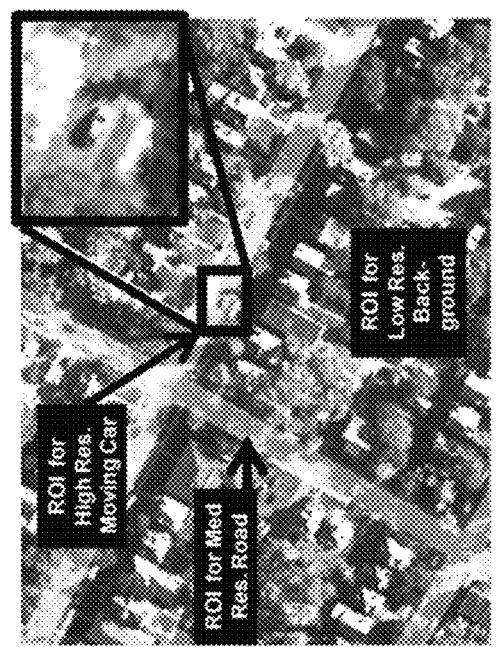
FIG. 13A is an illustration depicting an example output from a simulation of multi-ROI adaptable patch-based foveated compressive sensing image reconstruction.

Examples of patch-based CS reconstruction using both simulations and optical hardware are shown in FIGS. 13A and 13B. FIG. 13A shows results from the simulations of multiple ROI foveated patch-based CS reconstruction of a 1280×960 input frame from the CSUAV aerial dataset. Three hierarchical layers of ROIs were defined for background, roads, and vehicles with successively increasing ROI resolution for each layer. A demonstration of patch-based CS reconstruction in hardware using a conventional non-adaptive fixed resolution single-domain intensity-only CS camera is shown in FIG. 13B. In this example, the individual reconstructed 64×64 patches were stitched into a composite image.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for multi-domain foveated compressive sensing for adaptive imaging, the system comprising:
    a lens for providing input light of a scene onto a digital micro-mirror device (DMD) micro-mirror array;
    a DMD micro-mirror array, the DMD micro-mirror array having a plurality of individual DMD mirrors, such that each individual DMD mirror has two tilt states for dividing the input light into two paths, a spatial intensity/polarization path and a spectral path;
    a first two-dimensional (2D) patch deflector mirror array for receiving the spatial intensity/polarization path and dividing the scene into a plurality of patches and directing light for each patch onto a detector;
    a 2D detector array for receiving the plurality of patches and generating measurements for patch reconstruction in intensity and polarization domains; and
    a compressive sensing reconstruction module for reconstructing one or more patches in the intensity and polarization domains.

2. The system as set forth in claim 1, further comprising:
    a second two-dimensional (2D) patch deflector mirror array for receiving the spectral path and dividing the scene into a plurality of patch rows and separating each patch row vertically from neighboring rows;
    a grating device for receiving the patch rows and generating individual patch spectrums in a vertical direction;

a wavelength foveated detector array for receiving the individual patch spectra and generating foveated compressive measurements in a wavelength dimension of a given patch for a selected region of the spectrum;

a combiner module for combining the foveated compressive measurements for the selected region; and a second compressive sensing reconstruction module for reconstructing one or more patches in a spectral domain based on the selected region.

3. The system as set forth in claim 2, wherein the wavelength foveated detector array includes a plurality of detectors, with a number of detectors being equal to a desired number of individual patch spectrums as generated by the grating device.

4. The system as set forth in claim 3, further comprising a dual path total internal reflection (TIR) prism, where wherein each individual DMD mirror is placed in close proximity to the dual path TIR prism.

5. The system as set forth in claim 4, wherein the 2D detector array includes between one and four detectors per patch, where each detector includes a separate polarization filter.

6. The system as set forth in claim 5, wherein codes for reconstructing the patches are programed in the two tilt states of each individual DMD mirror.

7. The system as set forth in claim 6, wherein fovation or local variation of resolution is controlled by causing two or more of the individual DMD mirrors in the plurality of individual DMD mirrors to have common tilt states.

8. The system as set forth in claim 1, wherein the 2D detector array includes between one and four detectors per patch, where each detector includes a separate polarization filter.

9. The system as set forth in claim 1, wherein codes for reconstructing the patches are programed in the two tilt states of each individual DMD mirror.

10. The system as set forth in claim 1, wherein fovation or local variation of resolution is controlled by causing two or more of the individual DMD mirrors in the plurality of individual DMD mirrors to have common tilt states.

11. A method for multi-domain foveated compressive sensing for adaptive imaging, the method comprising acts of:

receiving input light of a scene onto a digital micro-mirror device (DMD) micro-mirror array;

dividing the input light into two paths, a spatial intensity/polarization path and a spectral path, using a DMD micro-mirror array, the DMD micro-mirror array having a plurality of individual DMD mirrors, such that each individual DMD mirror has two tilt states for dividing the input light into the two paths;

receiving, with a first two-dimensional (2D) patch deflector mirror array, the spatial intensity/polarization path and dividing the scene into a plurality of patches and directing light for each patch onto a detector;

receiving, with a 2D detector array, the plurality of patches and generating measurements for patch reconstruction in intensity and polarization domains; and reconstructing one or more patches in the intensity and polarization domains.

12. The method as set forth in claim 11, further comprising acts of:

receiving the spectral path and dividing the scene into a plurality of patch rows and separating each patch row vertically from neighboring rows;

receiving the patch rows and generating individual patch spectrums in a vertical direction;

receiving the individual patch spectra and generating foveated compressive measurements in a wavelength dimension of a given patch for a selected region of the spectrum;

combining the foveated compressive measurements for the selected region; and reconstructing one or more patches in a spectral domain based on the selected region.

13. The method as set forth in claim 12, wherein in reconstructing the patches, codes for reconstructing the patches are programed in the two tilt states of each individual DMD mirror.

14. The method as set forth in claim 13, further comprising an act of controlling fovation or local variation of resolution by causing two or more of the individual DMD mirrors in the plurality of individual DMD mirrors to have common tilt states.

15. The method as set forth in claim 11, wherein in reconstructing the patches, codes for reconstructing the patches are programed in the two tilt states of each individual DMD mirror.

16. The method as set forth in claim 11, further comprising an act of controlling fovation or local variation of resolution by causing two or more of the individual DMD mirrors in the plurality of individual DMD mirrors to have common tilt states.

* * * * *